(12) United States Patent
Ashiura

(10) Patent No.: US 6,930,153 B2
(45) Date of Patent: Aug. 16, 2005

(54) PRODUCTION OF MALEIC ANHYDRIDE MODIFIED BUTYL RUBBER AND USE THEREOF

(75) Inventor: Makoto Ashiura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 10/464,651

(22) Filed: Jun. 19, 2003

(65) Prior Publication Data

US 2004/0010089 A1 Jan. 15, 2004

(30) Foreign Application Priority Data

Jul. 10, 2002 (JP) ........................................ 2002-201506

(51) Int. Cl.$^7$ .............................. C08F 8/22; C08F 8/32; C08F 279/02; C08F 285/00
(52) U.S. Cl. ..................... 525/242; 525/285; 525/327.6
(58) Field of Search ............................... 525/242, 285, 525/327.6

(56) References Cited

U.S. PATENT DOCUMENTS 4,208,491 A * 6/1980 Gardner ...................... 525/254
5,852,135 A * 12/1998 Kanai et al. ................ 525/398

FOREIGN PATENT DOCUMENTS

| JP | S53-042289 A1 | 4/1978 |
| JP | S48-090385 A1 | 11/1978 |
| JP | S59-084901 A1 | 5/1984 |
| JP | H03-131643 A1 | 6/1991 |

* cited by examiner

*Primary Examiner*—James J. Seidleck
*Assistant Examiner*—Olga Asinovsky
(74) *Attorney, Agent, or Firm*—Rader, Fishman & Grauer PLLC

(57) ABSTRACT

A method for producing maleic anhydride modified butyl rubber comprising reacting a halogenated butyl rubber with maleic anhydride in the presence of (i) an acid acceptor and (ii) a monofunctional hindered amine and/or monofunctional hindered phenol; which is useful for further, modifying by a nitrogen-containing heterocyclic compound to form the modified butyl rubber having the improved processability.

7 Claims, No Drawings

PRODUCTION OF MALEIC ANHYDRIDE MODIFIED BUTYL RUBBER AND USE THEREOF

BACKGROUND OF THE INVENTION

1. Field of the Invention

The present invention relates to a production of maleic anhydride modified butyl rubber which is capable of forming, as a starting material, a modified butyl rubber having improved processability, while maintaining the physical properties, and the utilization thereof.

2. Description of Related Art

A halogenated butyl rubber is formed by dehydrohalogenation to form a conjugated diene structure. It is possible to react this conjugated structure with maleic anhydride to modify the butyl rubber. It is also possible to react this maleic anhydride modified butyl rubber with a compound containing an amine or hydroxyl group. This series of technologies is already known from Japanese Unexamined Patent Publication (Kokai) No. 48-90385 (method of producing conjugated diene butyl rubber), Japanese Unexamined Patent Publication (Kokai) No. 53-42289 (method of producing conjugated diene butyl rubber), Japanese Unexamined Patent Publication (Kokai) No. 59-84901 (method of producing conjugated diene butyl) and Japanese Unexamined Patent Publication (Kokai) No. 3-131643 (modified butyl rubber composition). However, no modification technology considering the processability of this modified butyl rubber is known.

SUMMARY OF THE INVENTION

Accordingly, the objects of the present invention are to provide a method for producing a starting maleic anhydride modified butyl rubber capable of forming the finally modified butyl rubber having improved processability without impairing the physical properties and also to provide such a modified butyl rubber and a rubber composition containing the same.

In accordance with the present invention, there is provided a method for producing maleic anhydride modified butyl rubber comprising reacting a halogenated butyl rubber with maleic anhydride in the presence of (i) an acid acceptor and (ii) a monofunctional hindered amine and/or monofunctional hindered phenol.

In accordance with the present invention, there are also provided a modified butyl rubber obtained by reacting the above maleic anhydride modified butyl rubber having the improved processability with a nitrogen-containing heterocyclic compound and a rubber composition containing the resultant modified butyl rubber.

DESCRIPTION OF THE PREFERRED EMBODIMENTS

A halogenated butyl rubber forms a conjugated diene structure when the halogenated locations are dehydrohalogenated. By reacting the conjugated diene portion with maleic anhydride, the maleic anhydride modified butyl rubber is formed. It is possible to further react this compound with a compound having an amine, hydroxyl group, etc. A series of reactions during the process of the formation of the conjugated diene and the reactions with maleic anhydride require the addition of a dehalogenation agent or the reaction at a high temperature. Even in the case of adding a dehalogenation agent, the reaction at a high temperature enables the conjugated diene to be easily formed.

However, if a halogenated butyl rubber is reacted at a high temperature, a decrease in the molecular weight occurs. Unless sufficient dehydrohalogenation proceeds, the remaining halogenated portions will react with a modifying agent (e.g., amine, alcohol, thiol, etc.) added in the final process and the physical properties and processability of the later modified butyl rubber will be deteriorated. Further, the addition of an antioxidant is effective in suppressing the decrease in the molecular weight, but an antioxidant sometimes reacts with the halogenated portions and deteriorates the processability of the butyl rubber.

Thus, according to the present invention, it was found that, by the use of an acid acceptor and an antioxidant having a large steric hindrance and monofunctionality in the series of reaction steps for the formation of a conjugated diene of a halogenated butyl rubber and the addition of maleic anhydride to the conjugated diene, the processability of the finally obtained modified butyl rubber is improved without impairing the physical properties thereof.

According to the method of production provided by the present invention, it is possible to finally obtain a modified butyl rubber having superior physical properties and processability by adding (i) an acid acceptor and (ii) a monofunctional hindered amine or monofunctional hindered phenol in the series of reaction steps for the formation of a conjugated diene of a halogenated butyl rubber and the addition of maleic anhydride to the conjugated diene.

The acid acceptor useable in the reaction process of the present invention is not particularly limited so long as it is an acid acceptor which can accept hydrohalides. For example, metal soaps, metal oxides, metal hydroxides, metal carbonates, etc. may be mentioned. Among these, in particular, magnesium oxide, lead oxide, calcium oxide, zinc oxide, magnesium hydroxide, calcium hydroxide, calcium carbonate, barium carbonate, etc. may be used. Among these, use of the magnesium oxide is particularly preferred.

The amount of the acid acceptor is not particularly limited, but the amount is preferably 0.05 to 10 parts by weight, more preferably 0.1 to 5 parts by weight, based upon 100 parts by weight of the halogenated butyl rubber. If the amount is too small, the dehalogenation is not sufficiently promoted and halogenated portions tends to remain without the dehydrogenation, and therefore, the desired processability is liable to be not obtained. On the other hand, if the amount is too large, the concentration of the reaction agent, that is, the maleic anhydride, in the reaction system is decreased, the desired reaction rate tends to be not obtained, and the desired physical properties are liable to be not obtained.

Further, the monofunctional hindered amine is not particularly limited. Specific examples are 6-ethoxy-2,2,4-trimethyl-1,2-dihydroxyquinoline, p,p'-dioctyl-diphenylamine, p,p'-dicumyldiphenylamine, N-phenyl-1-napthylamine, p-(p-toluenesulfonylamide)diphenylamine, alkylated diphenylamine, octylated diphenylamine, etc. The monofunctional hindered phenol is not particularly limited, either. Specific examples are 2,6-di-t-butyl-4-methylphenol, 3-(3,5-di-t-butyl-hydroxyphenyl) propionic stearate, (α-methylbenzyl)phenol, 2,6-di-t-butyl-4-ethylphenol, etc.

The amounts of the monofunctional hindered amine and monofunctional hindered phenol are not particularly limited, but these amounts are preferably 0.01 to 5 parts by weight, more preferably 0.1 to 2 parts by weight, based upon 100 parts by weight of the halogenated butyl rubber. If the amounts are too small, the molecular weight tends to be decreased. On the other hand, the amount is too large, the addition reaction of the maleic anhydride tends to be obstructed and the reaction rate tends to be decreased.

The reaction mechanism of the maleic anhydride modified rubber according to the present invention may be summarized as follows:

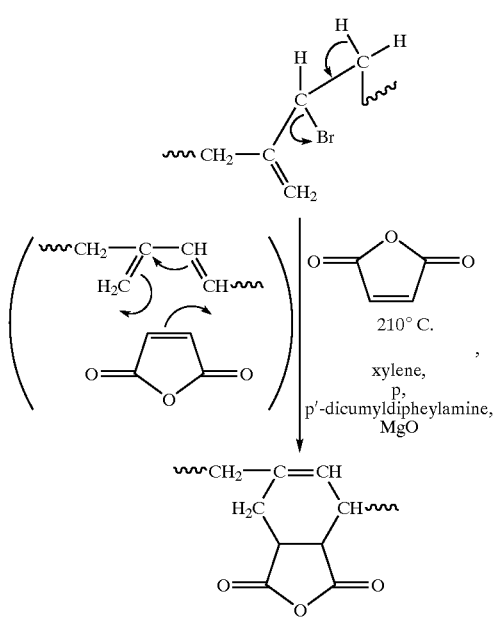

The modified butyl rubber according to the present invention can be easily obtained by reacting the maleic anhydride modified butyl rubber obtained above with a nitrogen-containing heterocyclic compound by a conventional method, e.g., a solid mixing reaction or solution mixing reaction of the maleic anhydride modified butyl rubber with a nitrogen containing heterocyclic compound. The nitrogen-containing heterocyclic compound usable in the present invention is not particularly limited so long as it is a compound having a nitrogen-containing heterocyclic ring such as, pyrrolenine, pyrrolidone, oxyindole (2-oxyindole), indoxyl (3-oxyindole), dioxyindole, isatin, indolyl, phthalimidine, β-isoindigo, monoporphyrin, diporphyrin, triporphyrin, azoporphyrin, phthalocyanine, hemoglobin, uroporphyrin, chlorophyll, phylloerythrin, imidazole, pyrazole, triazole, tetrazole, benzoimidazole, benzopyrazole, benzotriazole, imidazoline, imidazolone, imidazolidone, hidatoin, pyrazoline, pyrazolone, pyrazolidone, indazole, pyridoindole, purine, cinnoline, pyrrole, pyrroline, indole, indoline, oxalindole, carbazole, phenothiazine, indolenine, isoindole, oxazoles, thiazoles, isoxazoles, isothiazole, oxadiazole, thiadiazole, oxatriazole, triatriazole, phenanthroline, oxazine, benzoxazine, phthalazine, pteridine, pyrazine, phenazine, tetrazine, benzoxazole, benzoisoxazole, anthranil, benzothiazole, benzofurazane, pyridine, quinoline, isoquinoline, acridine, phenanthridine, anthrazoline, naphthyridine, thiazine, pyridazine, pyrimidine, quinazoline, quinoxaline, triazine, histidine, triazolidine, melamine, adenine, guanine, thymine, cytosine. These compounds may include another hetero atom in its ring and have a functional group capable of reacting with an acid anhydride group, for example, an amino group, hydroxyl group, or thiol. Specifically, dipyridylamine, 1,2-dimethylimidazole, 2-benzimidazole urea, pyrrole-2-carboxylic acid, 3-methylpyrrazole, 4 (or 2)-hydroxymethylpyridine, 2 (or 4)-(β-hydroxyethyl)-pyridine, 2 (or 4)-(2-aminoethyl)-pyridine, 2 (or 4)-aminopyridine, 2,6-diaminopyridine, 2-amino-6-hydroxypyridine, 6-azathymine, 3-amino-1,2,4-triazole, 3-aminomethyl-1,2,4-triazole, 3-methylamino-1,2,5-triazole, 3-methylol-1,2,4-triazole, 3-hydroxy-1,2,4-triazole, 2-hydroxytriazine, 2-aminotriazine, 2-hydroxy-5-methyltriazine, 2-amino-5-methyltriazine, 2-hydroxypyrimidine, 2-aminopyrimidine, 2-aminopyrazine, 2-hydroxypyrazine, 6-aminopurine, 6-hydroxypurine, 2-amino-1,3,4-thiadiazole, 2-amino-5-ethyl-1,3,4-thiazole, etc. may be mentioned. There are no specific limitations to the amount of the nitrogen-containing compounds, the nitrogen-containing compound is preferably 0.1 to 50 parts by weight, more preferably 0.1 to 30 parts by weight, based upon 100 parts by weight of the maleic anhydride modified butyl rubber.

Further, in the present invention, if the modified butyl rubber is mixed with various appropriate compounding agents and made into a rubber composition suitable for use in various applications such as, in addition to tires, belts, hoses, rubber shock absorbers, rollers, sheets, linings, rubber linings, sealing materials, gloves, bumpers, various medical and physicochemical products, civil engineering and construction products, marine, automobile, railroad, OA, aircraft, and packaging rubber products, etc., the processability is superior, without adversely affecting the inherent physical properties of the modified butyl rubber and therefore this is extremely useful.

The rubber composition according to the present invention may contain, in addition to the above modified butyl rubber, any conventional rubber (e.g., natural rubber (NR), polyisoprenes (IR), various styrene-butadiene copolymers (SBR), various polybutadienes (BR), acrylonitrile-butadiene copolymers (NBR), polyisobutyrenes, polybutenes, butyl rubbers, halogenated butyl rubbers, brominated isobutylene-p-methylstyrene copolymers, styrene-isoprene-butadiene copolymer, chloroprene rubbers, ethylene-propylene-diene terpolymers, ethylene-propylene copolymers, ethylene-propylene-butene terpolymers, acryl rubbers, silicone rubbers, fluorine rubbers, epichlorohydrin rubbers, various polymethacrylates, various polyethylenes, various polypropylenes, various polystyrenes, various poly (aromatic vinyls), various poly(vinylethers), various polyesters, various polyamides, cellulose, starch, various polymethanes, various polyureas, various polyamines), any conventional additives such as fillers (e.g., carbon blacks, silica), vulcanization or cross-linking agents, vulcanization or cross-linking accelerators, oils, antioxidants, etc. Although there are no specific limitations to the amount of the present modified butyl rubber in the rubber component, the preferable content therein is 0.5 to 100% by weight, more preferably 10 to 100% by weight.

EXAMPLES

The present invention will now be explained further by examples and comparative examples, but the technical scope of the present invention is of course not limited to these examples.

Example 1

As shown in Table I below, 120.0 g (i.e., 100 parts by weight) of brominated butyl rubber (butyl unit 2.08 mol), 12.0 g (i.e., 10 parts by weight) of maleic anhydride (0.123 mol), 13.0 g (i.e., 11 parts by weight) of xylene (0.123 mol), 1.43 g (i.e., 1.2 parts by weight) of magnesium oxide (0.0354 mol), and 1.2 g (i.e., 1.0 part by weight) of p,p'-dicumyldiphenylamine were charged into an internal mixer set at a temperature of 90° C. and mixed for 20 minutes. The mixture thus obtained was further mixed in an internal mixer set at a temperature of 210° C. for 40 minutes. A part of the polymer thus obtained was dissolved in toluene and the polymer was isolated and purified by reprecipitation. The purified product was used for IR analysis and $^1$H-NMR analysis, whereby the introduction of an acid anhydride group into the polymer was confirmed. The introduction rate was 2.1 mol %.

Example 2

As shown in Table II below, 120.0 g (i.e., 100 parts by weight) of the maleic anhydride modified butyl rubber obtained in Example 1 (acid anhydride group content 0.0413 mol) and 3.47 g (i.e., 3.0 parts by weight) of 3-amino-1,2,4-triazole (0.0413 mol) were mixed in an internal mixer set at a temperature of 120° C. for 40 minutes. A part thereof was used for IR analysis, whereby the introduction of aminotriazole moiety into the product was confirmed. The introduction rate was 1.9 mol %.

Comparative Example 1

As shown in Table I below, 120.0 g (i.e., 100 parts by weight) of brominated butyl rubber (2.08 mol: butyl unit), 12.0 g (i.e., 10 parts by weight) of maleic anhydride (0.123 mol), 13.0 g (i.e., 11 parts by weight) of xylene (0.123 mol) and 1.2 g (i.e., 1.0 part by weight) of N-phenyl-N'-1,3-dimethyl-p-phenylenediamine, all used in Example 1, were charged into an internal mixer set at a temperature of 90° C. and mixed for 20 minutes. The mixture thus obtained was further mixed in an internal mixer set at a temperature of 210° C. for 40 minutes. A part of the polymer thus obtained was dissolved in toluene and the polymer was isolated and purified by reprecipitation. The purified product was used for IR analysis and $^1$H-NMR analysis, whereby the introduction of an acid anhydride group into the polymer was confirmed. The introduction rate was 2.0 mol %.

Comparative Example 2

As shown in Table II below, 120.0 g (i.e., 100 parts by weight) of the maleic anhydride modified butyl rubber obtained in Comparative Example 1 (acid anhydride group content 0.0398 mol) and 3.35 g (i.e., 2.8 parts by weight) of 3-amino-1,2,4-triazole (0.0398 mol) were mixed in an internal mixer set at a temperature of 120° C. for 40 minutes. A part of the product was used for IR analysis, whereby the introduction of aminotriazole was confirmed (1.8 mol %).

Comparative Example 3

As shown in Table I below, 120.0 g (i.e., 100 parts by weight) of brominated butyl rubber (butyl unit 2.08 mol), 12.0 g (10 parts by weight) of maleic anhydride (0.123 mol), 13.0 g (i.e., 11 parts by weight) of xylene (0.123 mol), and 1.43 g (i.e., 1.2 parts by weight) of magnesium oxide (0.0354 mol) were charged into an internal mixer set at a temperature of 90° C. and mixed for 20 minutes. The mixture thus obtained was further mixed in an internal mixer set at a temperature of 210° C. for 40 minutes. A part of the polymer thus obtained was dissolved in toluene and the polymer was isolated and purified by reprecipitation. The purified product was used for IR analysis and $^1$H-NMR analysis, whereby the introduction of an acid anhydride group into the polymer was confirmed. The introduction rate was 1.9 mol %.

Comparative Example 4

As shown in Table II below, 111.7 g (i.e., 100 parts by weight) of the maleic anhydride modified butyl rubber obtained in Comparative Example 3 (acid anhydride group content 0.0352 mol) and 2.96 g (i.e., 2.7 parts by weight) of 3-amino-1,2,4-triazole (0.0352 mol) were mixed, in an internal mixer set at a temperature of 120° C. for 40 minutes. A part of the product was used for IR analysis, whereby the introduction of aminotriazole was confirmed (1.7 mol %).

Comparative Example 5

As shown in Table I below, 120.0 g (i.e., 100 parts by weight) of brominated butyl rubber (2.08 mol: butyl unit), 12.0 g (i.e., 10 parts by weight) of maleic anhydride (0.123 mol), 13.0 g (i.e., 11 parts by weight) of xylene (0.123 mol), 1.43 g (i.e., 1.2 parts by weight) of magnesium oxide (0.0354 mol), and 1.2 g (1.0 part by weight) of N-phenyl-N'-1,3-dimethyl-p-phenylenediamine were charged into an internal mixer set at a temperature of 90° C. and mixed for 20 minutes. The mixture thus obtained was further mixed in an internal mixer set at a temperature of 210° C. for 40 minutes. A part of the polymer obtained was dissolved in toluene and the polymer was isolated and purified by reprecipitation. The purified product was used for IR analysis and $^1$H-NMR analysis, whereby the introduction of an acid anhydride group into the polymer was confirmed. The introduction rate was 2.2 mol %.

Comparative Example 6

As shown in Table II, 126.3 g (i.e., 100 parts by weight) of the maleic anhydride modified butyl rubber obtained in Comparative Example 5 (acid anhydride group content 0.0486 mol) and, 4.08 g (i.e., 3.3 parts by weight) of 3-amino-1,2,4-triazole (0.0486 mol) were mixed in an internal mixer set at a temperature of 120° C. for 40 minutes. A part of the product was used for IR analysis, whereby the introduction of aminotriazole was confirmed (2.0 mol %).

Example 3

The anhydrous maleated butyl rubbers obtained by Example 1 and Comparative Examples 1, 3 and 5 were evaluated regarding the changes in viscosity (i.e., molecular weight) due to the existence or absence and types of the acid acceptors and the antioxidants during the reaction processes by means of a capillary rheometer. The results are shown in the following Table I.

TABLE I

|  | Ex. 1 | Comp. Ex. 1 | Comp. Ex. 3 | Comp. Ex. 5 |
| --- | --- | --- | --- | --- |
| (Reaction component: parts by weight) | | | | |
| Brominated butyl rubber*1 | 100 | 100 | 100 | 100 |
| Maleic anhydride*2 | 10 | 10 | 10 | 10 |
| Xylene*3 | 11 | 11 | 11 | 11 |
| MgO*4 | 1.2 | — | 1.2 | 1.2 |
| 6C*5 | — | 1 | — | 1 |
| DCDP*6 | 1 | — | — | — |
| Introduction rate of maleic anhydride (mol %) | 2.1 | 2.0 | 1.9 | 2.2 |
| Viscosity (molecular weight) | No change | No change | Decreased | No change |

Remarks
*1: Bayer Bromobutyl x2 available from BAYER
*2: Available from Mitubishi Chemical Ind. (Japan)
*3: Available from Kantoh Chemical Co. (Japan)
*4: Kyomag 150 available from Kyowa Chemical Ind. Ltd. (Japan)
*5: Santoflex 13 (N-phenyl-N'-1,3-dimethylbutyl-p-phenylene diamine) available from FLEXIS
*6: p,p'-Dicumyldiphenylamine available from Tokyo Kasei (Japan)

Example 4

Rubber compositions obtained by blending and mixing the modified butyl rubbers obtained in Example 2 and Comparative Examples 2, 4 and 6 and 30 parts by weight of carbon black were measured regarding tensile properties and processability by a capillary rheometer and visually evaluated. The results are shown in the following Table II.

TABLE II

| | Ex. 2 | Comp. Ex. 2 | Comp. Ex. 4 | Comp. Ex. 6 |
|---|---|---|---|---|
| (Component: parts by weight) | | | | |
| Maleic anhydride modified butyl rubber*1 | 100 | 100 | 100 | 100 |
| 3-amino-1,2,4-triazole*2 | 3.0 | 2.8 | 2.7 | 3.3 |
| Carbon black*3 | 30 | 30 | 30 | 30 |
| Tensile properties | | | | |
| M100 (MPa) | 0.9 | 0.8 | 0.6 | 0.7 |
| M300 (MPa) | 1.6 | 1.4 | 1.2 | 1.2 |
| $T_B$ (MPa) | 8.0 | 9.7 | 6.0 | 6.8 |
| $E_B$ (%) | 1500 | 1243 | 1471 | 1236 |
| Capillary rheometer temperature: 210° C. | | | | |
| Strands | Best | Poor | Good | Poor |
| Viscosity (poise) (shear rate: 1216 sec$^{-1}$) | 3398 | 6193 | 2626 | 5286 |

Remarks
*1: Synthesized products obtained by Example 1 for Example 2 and Comparative Examples 1, 3 and 5 for Comparative Examples 2, 4 and 6, respectively
*2: Available from Nippon Carbide Co. (Japan)
*3: Diablack G available from Mitsubishi Chemical Co. (Japan)

According to the above results, it is understood that the maleic anhydride modified butyl rubber obtained by the production method of the present invention and the modified products thereof are suppressed in the decrease in the molecular weights at the time of reaction and mixing, maintained in physical properties, and superior in processability. Therefore, the rubber composition of the present invention exhibits the physical properties inherent to a modified maleated butyl rubber in various applications and can be easily processed.

What is claimed is:

1. A method for producing maleic anhydride modified butyl rubber comprising reacting a halogenated butyl rubber with maleic anhydride in the presence of (i) an acid acceptor and (ii) a monofunctional hindered amine.

2. A method as claimed in claim 1, wherein said acid acceptor is magnesium oxide.

3. A method as claimed in claim 1, wherein the amount of the acid acceptor is 0.05 to 10 parts by weight, based upon 100 parts by weight of the halogenated butyl rubber.

4. A method as claimed in claim 1 wherein the amount of the monofunctional hindered amine is 0.01 to 5 parts by weight, based upon 100 parts by weight of the halogenated butyl rubber.

5. A modified butyl rubber obtained by reacting said maleic anhydride modified butyl rubber according to claim 1 with a nitrogen-containing heterocyclic compound.

6. A modified butyl rubber as claimed in claim 5, wherein the amount of the nitrogen-containing heterocyclic compound is 0.1 to 50 parts by weight, based upon 100 parts by weight of the maleic anhydride modified butyl rubber.

7. A rubber composition comprising the modified butyl rubber according to claim 6.

* * * * *